May 28, 1957 L. RADO 2,793,481
MACHINE FOR THE PRODUCTION OF CONTAINERS FILLED WITH LIQUIDS
OR PASTES FROM PLIABLE NON-METALLIC
MATERIAL OF THERMOPLASTIC NATURE
Filed Nov. 21, 1949 8 Sheets-Sheet 1

INVENTOR
LEOPOLD RADO

May 28, 1957 L. RADO 2,793,481
MACHINE FOR THE PRODUCTION OF CONTAINERS FILLED WITH LIQUIDS
OR PASTES FROM PLIABLE NON-METALLIC
MATERIAL OF THERMOPLASTIC NATURE
Filed Nov. 21, 1949 8 Sheets-Sheet 3

INVENTOR
LEOPOLD RADO

BY Wilkinson, Mawhinney & Theibault
ATTORNEYS

INVENTOR
LEOPOLD RADO

May 28, 1957 L. RADO 2,793,481
MACHINE FOR THE PRODUCTION OF CONTAINERS FILLED WITH LIQUIDS
OR PASTES FROM PLIABLE NON-METALLIC
MATERIAL OF THERMOPLASTIC NATURE
Filed Nov. 21, 1949 8 Sheets-Sheet 5

INVENTOR
LEOPOLD RADO

May 28, 1957 L. RADO 2,793,481
MACHINE FOR THE PRODUCTION OF CONTAINERS FILLED WITH LIQUIDS
OR PASTES FROM PLIABLE NON-METALLIC
MATERIAL OF THERMOPLASTIC NATURE
Filed Nov. 21, 1949 8 Sheets-Sheet 6

INVENTOR
LEOPOLD RADO

May 28, 1957

L. RADO 2,793,481

MACHINE FOR THE PRODUCTION OF CONTAINERS FILLED WITH LIQUIDS
OR PASTES FROM PLIABLE NON-METALLIC
MATERIAL OF THERMOPLASTIC NATURE

Filed Nov. 21, 1949

INVENTOR
LEOPOLD RADO

BY
Wilkinson, Mawhinney & Theibault
ATTORNEY

United States Patent Office 2,793,481
Patented May 28, 1957

2,793,481

MACHINE FOR THE PRODUCTION OF CONTAINERS FILLED WITH LIQUIDS OR PASTES FROM PLIABLE NON-METALLIC MATERIAL OF THERMOPLASTIC NATURE

Leopold Rado, London, England; Dorothy Frances Pickering, executrix of said Leopold Rado, deceased Application November 21, 1949, Serial No. 141,982

9 Claims. (Cl. 53—285)

The subject of the present invention is a machine to carry out the process described in my Patent No. 2,530,400.

The process of the said prior specification in the main has for its subject the production of containers filled with liquids or pastes from a pliable non-metallic material of thermoplastic nature, for example vinyl resin, and in particular polyvinyl chloride or the like, in which process a length of tubing adapted to provide a number of containers is filled, whereafter pressure is applied laterally to the tubing walls at distances apart equal to the length of a single container to cause the contents to be displaced from the places where the pressure is applied so that the walls of the tubing make contact with each other thereat, after which heat is applied thereto and the contacting walls become welded together whereby a tube-like container sealed at both ends is produced which is separated from the remaining part of the tubing by cutting along the centre of the width of the welded place so that the severed end of the length of tubing is also sealed.

The machine for putting this process into operation is the object of the present invention, and is characterised chiefly by the fact that the apparatus is provided with a presser part formed by two symmetrical tools, at least one of which is mobile, and on the filled tubing being pressed transversely between the said two tools, the contents of the tubing are divided and the flattened tubing walls meet in a plane passing through the axis of the tubing, whereafter the pressing tools produce a degree of heat necessary to unite the contacting walls at the pressure places.

In the case of one of the two symmetrical tools of the presser part being mobile, the stationary counter tool will be the lower tool and will be provided with a supporting table consisting of two mobile portions so arranged as to leave a gap between said portions for the pressing tool. The supporting table can also consist of one piece but is provided with the gap for the pressing tool. During the operation the mobile supporting table will move at the same time and in the same direction as the mobile pressing tool, such table movement being equal to the radius of the filled tubing.

In the case of the machine being provided with a presser part formed by two movable symmetrical tools arranged on each side of the passage of the tubing, said tools are connected kinematically to each other so that their travel is identical, and the flattened portion of the tubing pressed between the said two tools is in a plane passing through the axis of the tubing.

Electrical means are provided to produce the heat to carry out unification by welding of the contacting walls caused by the pressure of the symmetrical tools thereon. Firstly, however, the pressing tools divide the tubing contents and cause the tubing walls to flatten and contact, and only thereafter is heat transmitted to the pressing tools to carry out the welding.

The electrical and thermal properties of the thermoplastic tubing used determines the electrical heat-generating part of the machine, but the main requirements are that the pressing tools generate the heat and for this purpose are connected to electrical means, and only after the pressing tools have displaced the contents and the tubing walls contact each other by pressure is the circuit closed for generation of the electrical impulse which carries out the welding.

If the thermoplastic tubing has high dielectrical properties such as, for example, of polyethylene, a so-called "flash" carries out the welding. In this case the pressing tools are connected to the electrical equipment and the welding surfaces of the pressing tools are covered with polytetrafluoroethylene. If the tubing used is, for example, vinyl resin, the pressing tools are electrodes connected to a radio frequency generator, the electrical circuit being closed only after the complete flattening of the tubing at the portions pressed and the displacement of the tubing contents therefrom has taken place.

During the welding operation the pressed portions of the tubing become soft and have a reduced tension strength also on the line bordering the filled tubing. In consequence thereof the liquid or paste causes an inner pressure in the tubing and there is danger of breakage on the said border line. For this reason the pressing tools are provided on each side thereof with an insulating material of a thickness such as will, during welding, hold away the inner pressure caused by the filled contents from the softened and tension-weak border line.

In certain cases this insulation will be also important if the content of the tubing is such as to be affected by the neighbouring heat generated by the pressing tools during welding.

As the pressing tools during the welding of the contacting walls have to reduce the wall thickness thereof, it is necessary that the insulating material on each side of the pressing tools is movable in relation to the side walls of the pressing tools, whereby after the pressing tools and the insulating material have together pressed away the contents, the welding tools are able to come near each other to carry out welding.

An arrangement of the two symmetrical sealing surfaces of the pressing tool is such that one sealing surface seals transversely in a straight line at 90°, and the other in a straight line at an angle as arranged, whereby the package produced is pointed at one end thereof.

The machine is provided with a device which controls the opening and closing movement of the pressing tools. For this purpose the machine is provided chiefly with a rotary disc provided on one or on each of its surfaces with a primary cam working together with a roller acting on the control members for the pressing tools to which it imparts through its rotation a periodic and alternating translational movement that brings the pressing tools at regular intervals in close contact with the tubing for the distribution of the contents therein and subsequent pressing of the tubing walls to contact each other for welding.

A second cam working together with a roller acts on the control parts of the device which ensures the carrying along of the tubing in a discontinuous manner but in constant direction. The respective positions on the rotary disc of the cam controlling the opening and closing movements of the pressing tools, and the cam controlling the forward movement of the tubing, is such that the carrying along of the tubing takes place when the tools of the presser member are drawn apart, each forward movement of the tubing being equal in length, and in step with the opening movement of the pressing tools.

The control machine parts actuated by means of rollers working together with the cams, as mentioned above, may be driven mechanically by air, or by hydraulic pressure, or electric mechanically, electromagnetically, photoelectrically, etc.

The heating of the pressing tools will be performed preferably in an intermittent way and by means of electrical character. In a specially advantageous method of carrying out the heating for welding, the pressing tools are formed by elecetrodes that are charged intermittently by the closing of a circuit fed by a high frequency generator, the intermittent closing of the circuit being carried out in step with the closing movement of the pressing tools, so that this closure only occurs after the complete flattening of the tubing and the pressing aside of the contents thereof from the portions pressed.

For this purpose, in a possible method for carrying out the invention, the rotary disc furnished with cams that fix the in-step movement of the pressing tools and of the carrying system for the tubing, is provided additionally with a sloping surface working together with a stationary outer contact for fixing the closing of the circuit during the period when the pressing tools are pressed closely against the tubing. The sloping surface abovementioned will be formed to advantage by a movable stop, the position of which it will be possible to vary on the rotary disc and to thereby alter the moment of connection of the circuit for the heating of the pressing tools and the duration of said heating.

Thermoplastic materials of very high dielectric properties such as polyethylene, cannot be successfully welded by high frequency heating. In this case an impulse heating or "flash" welding method is to be used for the generation of the impulse or "flash" to the pressing tools, and therefore instead of a high frequency generator an impulse generator will be connected to the pressing tools which are no longer electrodes.

To avoid the sticking of the thermoplastic material to such welding tools the surfaces thereof are to be covered with polytetrafluoroethylene or silicone.

When either high frequency welding or "flash" welding method is used repeatedly, the pressing tools retain a certain heat which accumulates in such degree that on contacting the tubing walls before the displacement of the contents has occurred, the outer surface of the tubing wall becomes softened and bursts can occur, in particular when thin walled tubings are used. To avoid this, compressed air is blown on the pressing tools for cooling. In the case of the welding tools being electrodes, the welding tools are so blown during the welding that the air goes through the space between the welding tools not occupied by the tubing. Experience has shown that in this case no sparking occurs. It is advantageous if the nozzle of the compressed air conductor is rigidly fixed to the presser parts and moves therewith during the pressing.

The machine is provided with two conveyors to carry the filled tubing along in an equal movement in constant direction but in discontinuous manner, the said conveyors being separated from each other by a space and the presser parts for the tubing being arranged in said space at least one of the conveyors, preferably that which brings the tubing into the space between the pressing tools, being provided with a set of V-shaped holders enabling tubing of various sizes to be carried along.

The second conveyor can be in the form of an endless band moving with a greater speed than the first conveyor provided with V-shaped holders, so that a slight friction occurs on the tubing lying on this band which slightly stretches the tubing during the movement from one carrier to the other.

It is essential, in particular if thermoplastic tubing of elastic nature is used, for example polyvinyl chloride tubing with a high content of plasticiser, that the liquid or pastry substance is kept in the tubing at constant pressure in order that the amount of substance successively enclosed at each operation of the pressing tools, is constant. The machine is provided with a device for this purpose which consists of a receiver, and that end of the tubing which is the last to be sealed is bent above the receiver, said bent portion being of such length as does not dip into the liquid.

The receiver is placed in such vertical distance from the sealing tool as is required to achieve a gravity pressure of the liquid in the tubing. That pressure will be determined by the vertical height of the end of the bent portion of the tubing.

During the pressing of the tubing walls for welding, a quantity of the tubing contents will, on displacement, move backwards and thereby push the tubing contents backwards, and such quantity as has been displaced by pressure will fall into the receiver at each pressure movement of the tools. The filled tubing in its entire length is laid on a trailer consisting of rollers on which the tubing is moved by the conveyor and the receiver moves with the tubing until the last package has been produced therefrom.

To save working space the filled tubing is wound over a rotating tubing holder from which the tubing is unwound at a speed corresponding to the rhythm of its carrying along by the machine. In the latter case the receiver, to retain the liquid pushed backward in the tubing at each pressing operation, is stationary, or can also rotate if the axis of the rotating tubing holder is vertical.

The portion of the tubing bent above the receiver can be a permanent tube of rigid material which is connected to the thermoplastic tubing and secured thereto with a suitable connecting device, thus allowing the thermoplastic tubing to be used up to its actual end.

The machine is provided with a knife heated by an electric resistance, actuated by the cam controlling the movement of the heating pressing tools or by an identical cam synchronised with the first one, this knife being applied through a movement similar to that of the pressing tools on the portion of the tubing where the walls have previously been welded by the pressing tools causing thereby the cutting of this portion of the tubing.

The cam controlling the movement of the pressing tools or a cam that is exactly the same and in step with the first one, acts on the control members of a single or double printing block that is pressed on the filled tubing at a suitable spot by a movement similar to that of the pressing tools, the printing block or blocks being provided with a frame that is set flexibly and presses on the tubing before the block itself creating thereby, through the flexible change of shape of the tubing, a substantially level portion rendering it easier to print evenly the types of the printing block.

A better understanding will be obtained of the invention through the following detailed disclosure, given with reference to the accompanying drawings shown only as an example and in which.

According to a main characteristic of the invention the tubing of thermoplastic material 1 filled with liquid or pasty substance goes between two pressing tools 2 and 3 capable of moving against each other in a way symmetrical with reference to the axis of the tubing 1.

This symmetry of movements of the pressing tools 2 and 3 may be ensured by any method of suitable kinematic linking between the two tools.

In the method of carrying out the invention as illustrated in the drawing, the pressing tool 2 is fixed rigidly with a reversed U-shaped support 4 of which the arms 4ª and 4ᵇ are furnished on their inner surface with teeth constituting a rack. The pressing tool 3 is fixed rigidly with a vertical support 5 of which the two surfaces opposite the internal surfaces of the arms 4ª and 4ᵇ of the support 4 are furnished with teeth of exactly the same form as those provided on the arms 4ª and 4ᵇ.

Pinions 6ª and 6ᵇ keyed respectively on spindles 7ª and 7ᵇ fixed rigidly with a frame 8 mesh respectively with the teeth provided on the internal surface of the arm 4ª and the corresponding teeth of the support 5 on the one hand, and the teeth provided on the internal surface of the arm 4ᵇ and the teeth provided on the corresponding surface of the support 5 on the other hand, so that if the support 4 of the pressing tool 2 comes down the support 5 of the pressing tool 3 comes up by an equal distance and vice versa. The support 4 is guided in its motion by the bearing surface of the outer surfaces of its arms 4ª and 4ᵇ on slideways of the frame 8 and the support 5 is guided in its motion by a tenon 9 that slides in a corresponding bore 10 of the same frame 8.

Springs 11ª and 11ᵇ placed between the lower ends of the arms 4ª and 4ᵇ of the support 4 and the frame 8 tend to push the support 4 upwards, that is to say to keep apart the pressing tools 2 and 3.

The support 4 of the pressing tool 2 is provided on its upper portion with two rollers 12 working together with two identically the same cams 13 keyed on the two surfaces of a rotary disc 14, the recurring contact of the cams 13 and the rollers 12 causing the lowering of the support 4 against the action of the springs 11ª and 11ᵇ and consequently the symmetrical changing of position of the pressing tools 2 and 3 against each other, a movement that will be termed in what follows the closing movement of the pressing tools. As soon as the cams stop acting on the rollers 12, the springs 11ª and 11ᵇ act in the opposite directions and cause the drawing apart of the pressing tools 2 and 3, a movement that will be termed in what follows the opening movement of the pressing tools.

The driving method for the rotary disc 14 is shown diagrammatically by the engaging of the driving pinion 15 with a toothed wheel 16 cut on the periphery of the disc 14.

The contour of the cam 13 is provided with a circumferential portion of which the radius is such that when this portion is in contact with the roller 12 the pressing tools 2 and 3 are closed again on the tubing 1 of which the walls are completely flattened and pressed strongly against each other, the flattened portion of the tubing being in a plane going through its axis.

On the spindle of the rotary disc 14 is keyed another cam 17 working together with a roller 18 fixed rigidly with a rod 19 acting on one of the ends of a beam 20 pivoted at 21 and of which the other end, in the shape of a fork 22, acts on a device enabling the tubing 1 to be drawn along at regular intervals in the direction denoted by the arrow F.

A spring 23 tends to keep the roller 18 pressed constantly against the cam 17.

The device ensuring the drawing along of the tubing at regular intervals is made up of two jaws 24 and 25 capable of drawing nearer or drawing apart from each other by sliding on parallel spindles 26, the whole being capable of being drawn in a direction parallel to the axis of the tubing 1, alternately in one direction and in another, by the engaging of lugs 27 in ports 28 cut in the arms of the fork 22.

The jaws 24 and 25 are provided besides respectively with studs 29 and 30 engaging with symmetrical grooves 31 and 32 arranged in the side walls of a casing 33.

Each of the grooves 31 and 32 is provided with two portions parallel to each other and to the axis of the tubing 1. They are so shaped that, with the jaws 24 and 25 being drawn by the fork 22 successively in one direction and in the other, the teats 29 and 30 engage on the outward journey, that is to say in the direction of the arrow F, with the inner portions of the grooves 31 and 32, and on the return journey with the outer portions of these same grooves. The result of this is that the jaws 24 and 25 are brought nearer on the outward journey and drawn apart on the return journey.

On the outward journey, when the jaws are brought nearer, they compress between them the tubing 1 and draw it with them in their translational movement.

On the return journey, when the jaws are drawn apart they do not pull the tubing 1 that remains stationary. The latter consequently is only drawn in the direction of the arrow F and in an intermittent way.

The linear displacement of the tubing 1 is a function of the extent of the swinging movement of the fork 22. This amplitude may be varied, and consequently the length of the successive displacements of the tubing, by causing a variation in the position of the pivot 21 on the beam 20.

This drawing device for the tubing is moreover well known per se and is of little moment as far as the invention is concerned. It may be replaced by any standard equivalent device.

The respective position of the cams 13 and 17 on their common axis is such that the drawing movement of the tubing 1 is only brought in when the pressing tools 2 and 3 are spaced apart at their widest, the actual tubing on the other hand not being subject to any pull on the part of the drawing device during the period when the pressing tools 2 and 3 are closed again on it.

In the method of carrying out the invention that has been disclosed, the control parts of the movement in step with the pressing tools and the system for drawing along the tubing, caused respectively by the actions of the cams 13 and 17, are mechanical in character. It is obvious that these cams might act on the two main parts of the machine that they control respectively by means of control members of any other character, such as air-operated, hydraulic, electro-mechanical, electro-magnetic, photo-electric, etc.

Figure 1:
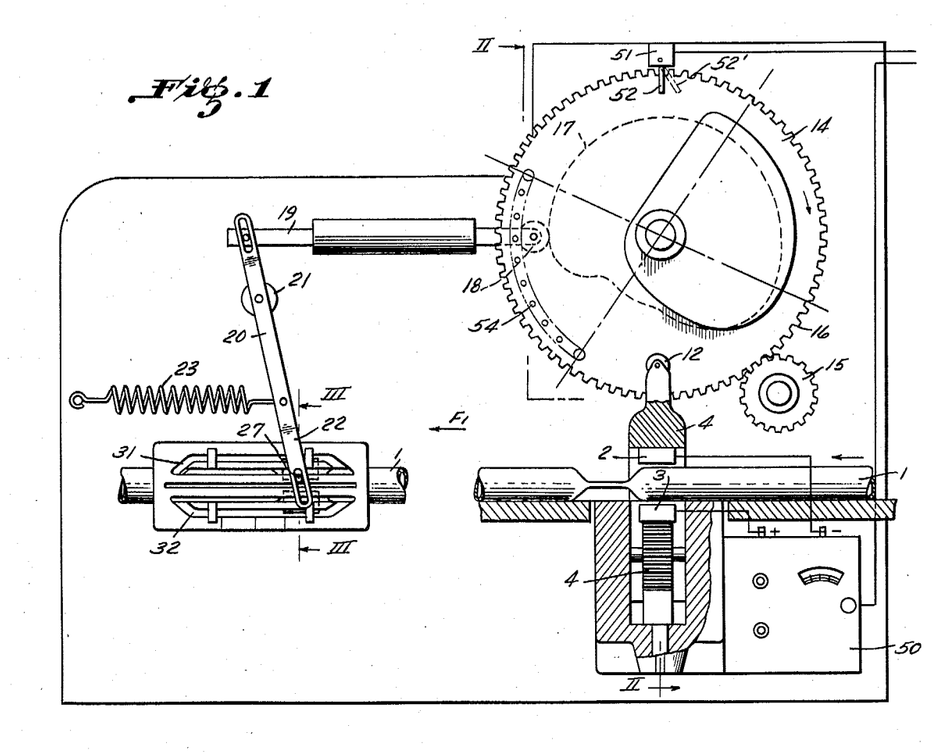
Figure 1 is a view given in quite a diagrammatic way of an arrangement in accordance with the invention controlling at one and the same time the symmetrical movements of the heating pressing tools and the synchronous movement for the intermittent drawing along of the thermoplastic tubing.
Figure 1A:
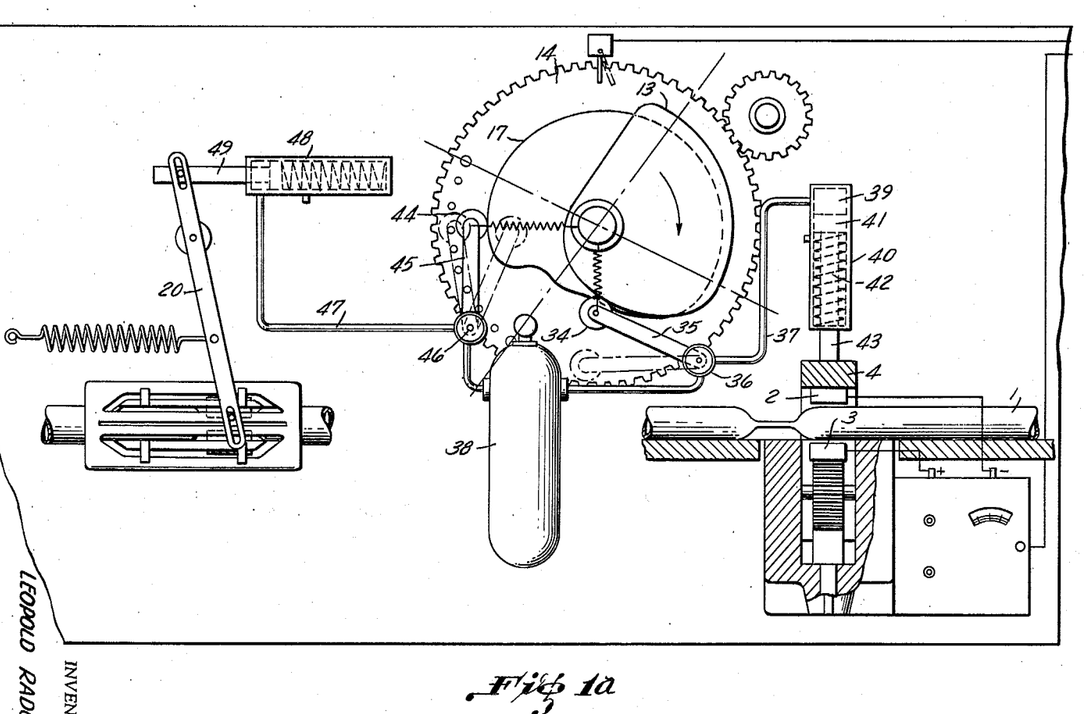
Figure 1a is a similar diagrammatic view corresponding to Fig. 1 and illustrating a modification of the invention in which the symmetrical movements of the heating pressing tools and the synchronous movement for the intermittent drawing along of the tube of thermoplastic material, are controlled by means of air-operated devices.

Figure 1a illustrates in quite a diagrammatic way merely as a guide a method of carrying out with air-operated control.

The cam 13 works together with a roller 34 fixed rigidly with a pivoting arm 35 that controls, according to the angular position of the cam 13, the opening or closing of a cock 36 located on a pipe 37 connecting a supply of gas under pressure 38 to the chamber 39 of a cylinder 40 inside which a piston 41 can slide against the action of a spring 42.

The translational movement of the piston 41 is transferred by a rod 43 to the support 4 of the pressing tool 2.

In the same way, the cam 17 works together with a roller 44 fixed with a pivoting arm 45 controlling the opening or the closing of a cock 46 located on a second pipe 47 connecting the gas supply under pressure 38 to a second cylinder 48 similar to cylinder 40 and that acts by means of a rod 49 on the end of the beam 20 controlling the device for the intermittent drawing along of the tubing as previously disclosed.

With the object of causing the union of the walls of the tubing compressed between the pressing tools 2 and 3 when the latter are in the closed position, any heating means may be provided for the pressing tools. It will be advisable to carry out this heating at regular intervals with the purpose of saving power and also, and above all, for avoiding the heating of the thermoplastic tubing outside the exact places where the union has to be made.

One of the main characteristics of the invention lies in effecting the heating of the pressing tools 2 and 3 only after these tools are completely closed on the tubing of thermoplastic, the complete flattening of the actual tubing and the displacement of its content from the pressed portion already having been accomplished by pressure of the tools. As a matter of fact, the union of the tube walls through the combined effect of heat and pressure may only be successfully performed provided that these walls are in close contact with each other without the inclusion between them of the substance contained in the tubing.

The pressing tools 2 and 3 may be heated for instance by an admission of superheated steam at regular intervals or by electrical resistances connected at recurring intervals, the steam admission or connecting of resistances being in step with the movement for drawing along the thermoplastic tubing at stated intervals.

In the example illustrated in the drawings, the pressing tools 2 and 3 form electrodes that are connected respectively to the negative and positive poles of a high frequency generator 50. This generator is cut in or cut out by a contact 51 furnished with a swinging arm 52 that works together with a set of movable stops 53 fastened in a set of holes 54 provided for this purpose on the rotary disc 14. When the swinging arm 52 comes, through the rotation of the disc, in contact with the stops 53 it assumes the sloping position shown at 52', a position that fixes the switching in of the generator 50 and the passing of a high-frequency current between the electrode-tools 2 and 3 calculated to effect the union of the walls of the thermoplastic tubing.

The position of the stops 53 on the rotary disc 14 is figured respectively to the position of the cam 13 so that the switching in of the generator 50, and consequently the passing of the uniting current between the electrode-tools 2 and 3, only occurs when the tools 2 and 3 are completely closed again on the thermoplastic tubing after having displaced the content from the pressed portion.

Moreover, a variation may be made at will of the moment when the connecting of the generator takes place and the duration of this connection by varying the position of the movable stops 53 on the rotary disc 14 and the number of these stops.

Figure 2:
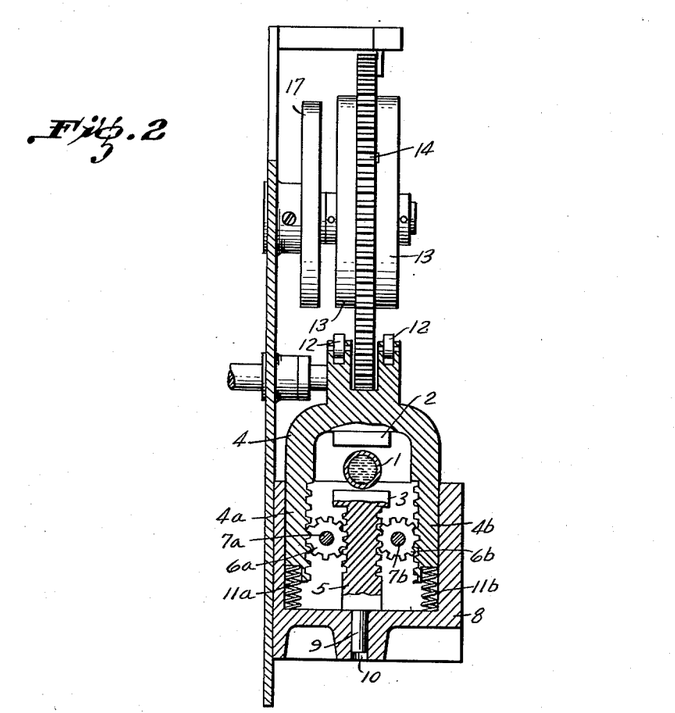
Figure 2 is a side view partly in section along the line II—II of Figure 1.
Figure 3:
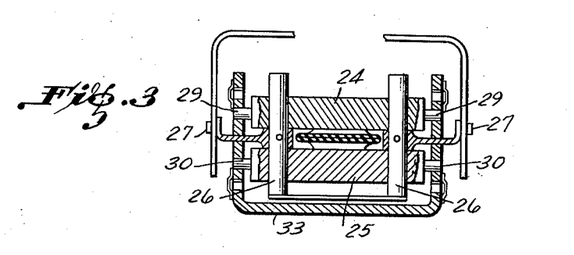
Figure 3 is a sectional view along the line III—III of Figure 1.

The device illustrated in Figs. 1, 1a, and 2, is provided with a tool 2 and 3 for flattening a filled tubing 1.

Figs. 4 to 11 illustrate modifications of a device for flattening the tubing from place to place.

Figure 4:
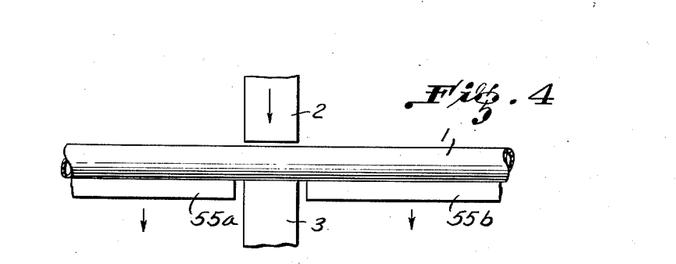
Figure 4 is a diagrammatic view of a device for flattening the tubing.
Figure 5:
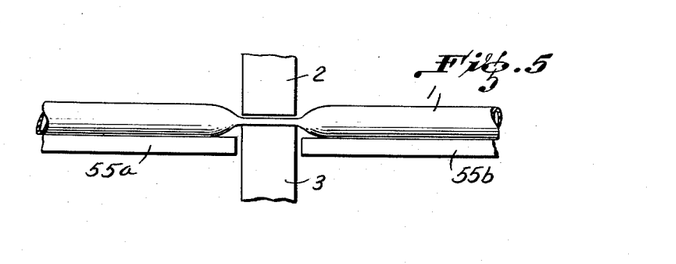
Figure 5 illustrates the device of Figure 4 after the tubing has been flattened.

The device illustrated in Figs. 4 and 5 is a flattening tool of which part 2 may move downwards to flatten the filled tubing 1 on a fixed counter tool 3.

In order that the flattening of the tubing may be made in the axis of the tubing, a supporting table is provided therefor, the portions of which are market 55$^a$ and 55$^b$. The said supporting table moves downward at the same time as part 2 of the pressing tool makes a similar movement, the distance of the movement of the supporting table being half the diameter of the filled tubing, as is shown in Fig. 5 in which the supporting table has assumed low position in relation to the counter tool 3.

Figure 6:
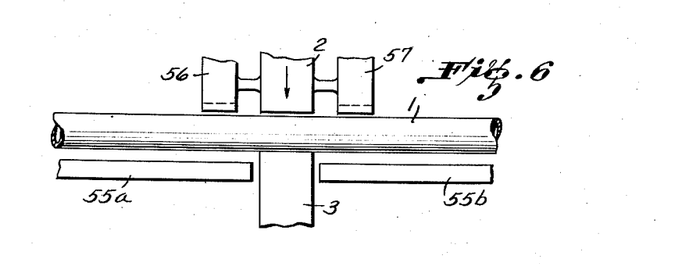
Figure 6 illustrates a modification of the device for flattening the tubing.
Figure 7:
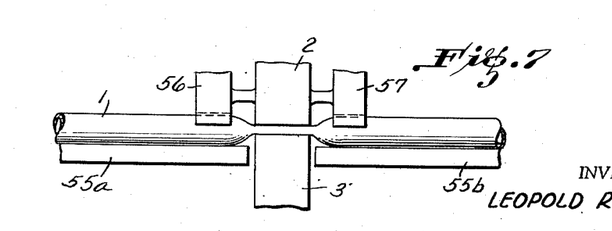
Figure 7 illustrates the device of Figure 6 after the flattening of the tubing.

Figs. 6 and 7 illustrate a modification of the flattening device shown in Figs. 4 and 5, wherein pressing parts 56 and 57 are rigidly fixed to the mobile tool part 2. These pressing parts 56 and 57 are so placed in relation to the tool part 2, that they only reach the filled tubing 1 when the tool 2 is already at half stroke, they then descend on to the tubing 1 and hold the filled tubing in a fixed position.

Figures 5, 8, 9, 16:
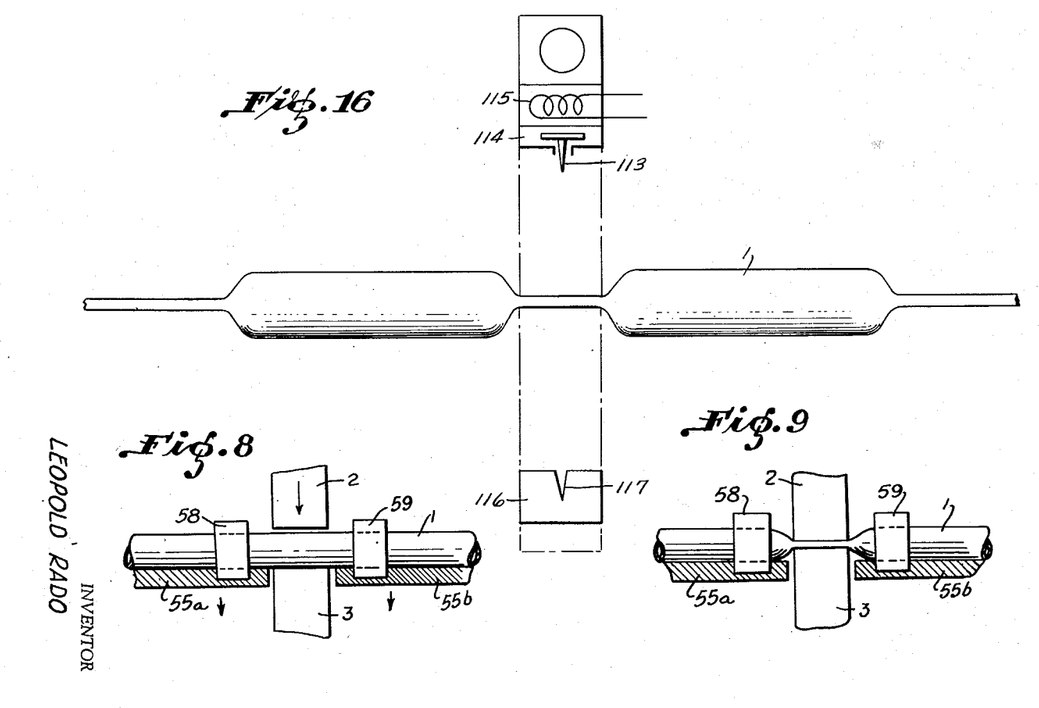
Figure 8 illustrates another modification of the device for the flattening of the tubing.
Figure 9 illustrates the device of Figure 8 after the tubing has been flattened.
Figure 16 is a diagrammatic illustration of a device for cutting the portion of the tubing of thermoplastic material that has been previously flattened and united together by the pressing tools.

Figs. 8 and 9 illustrate a modification of the device for flattening the tubing wherein the filled tubing is guided by two rings marked 58 and 59, said rings being fixed rigidly to the fixed portions 55$^a$ and 55$^b$ of the supporting table.

Figure 8A illustrates a modified form of pressing and welding tool wherein a unit package is formed between the pressing and sealing members 5, 5$^b$, 6 and 6$^b$ carried by the tool parts 2 and 3.

Figure 10:
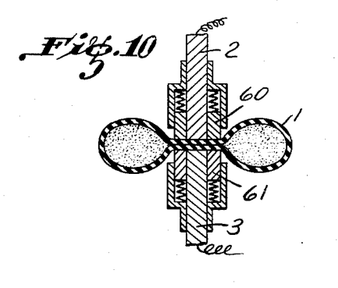
Figures 10 and 11 illustrate a diagrammatic view of the device for flattening the tubing and of the pressure parts which hold away the contents from the immediate neighbourhood of the heating pressing tools.
Figure 11:
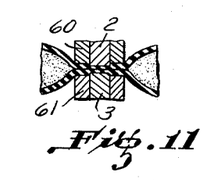

Figures 10 and 11 show the last modification, wherein the pressing tool parts 2 and 3 are provided with pressure parts 60 and 61 to hold away the contents of the tubing from the immediate neighborhood of the pressing tool parts 2 and 3.

Figures 12, 13:
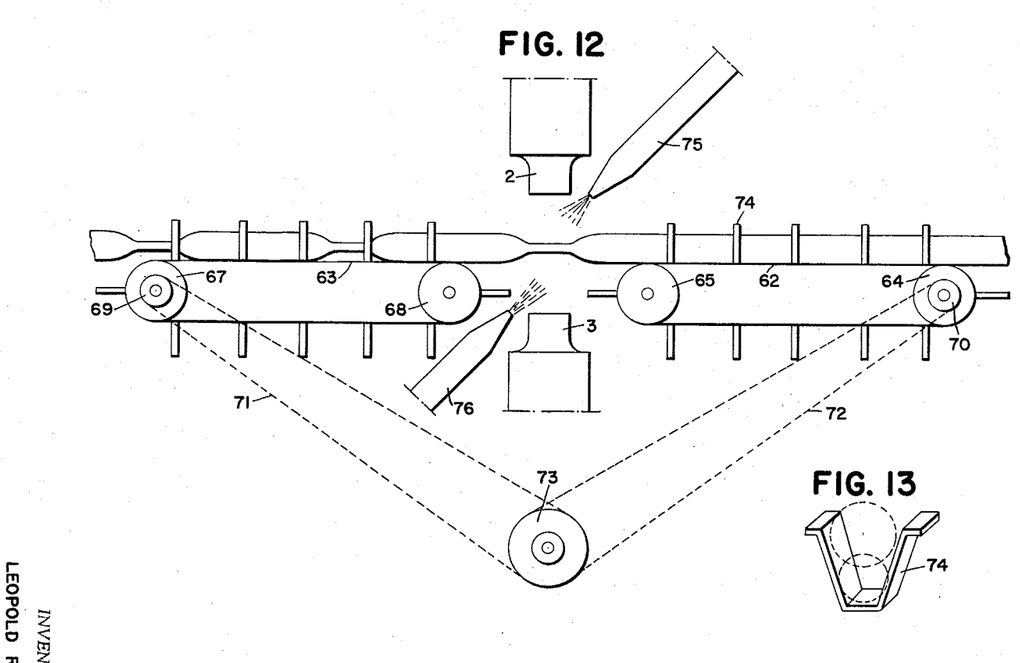
Figure 12 illustrates in a diagrammatic way the portion of the equipment provided with the heating presser parts and the conveyor of the tubing.
Figure 13 illustrates in perspective a holder of the conveyor.

Figure 12 illustrates in diagrammatic way the portion of equipment provided with the presser parts and the conveyor to transport the tubing forward in the machine. The presser parts are marked 2 and 3 and the filled tubing 1. This tubing is pressed at equal distances by the presser parts 2 and 3. In order to move the tubing forward in the machine the tubing is placed on conveyor belts 62 and 63. These endless belts travel over rollers 64, 65, 67 and 68. The rollers 64 and 67 are driven by means of pulleys 69 and 70 of the belts 71 and 72 and the drawing pulley 73.

Each conveyor belt carries holders 74 that hold the tubing 1 and cause its forward movement.

Figure 13 illustrates the holders 74 of Figure 12 widened out so as to enable tubings of varying sizes to be carried thereby.

The presser parts 2 and 3 are each provided with a nozzle 75 and 76 rigidly fixed thereto, through which cool air is blown to cool the tubing as it is pressed and to prevent possible sparking between the heating pressing parts 2 and 3 if high frequency current is used for welding.

Figure 14:
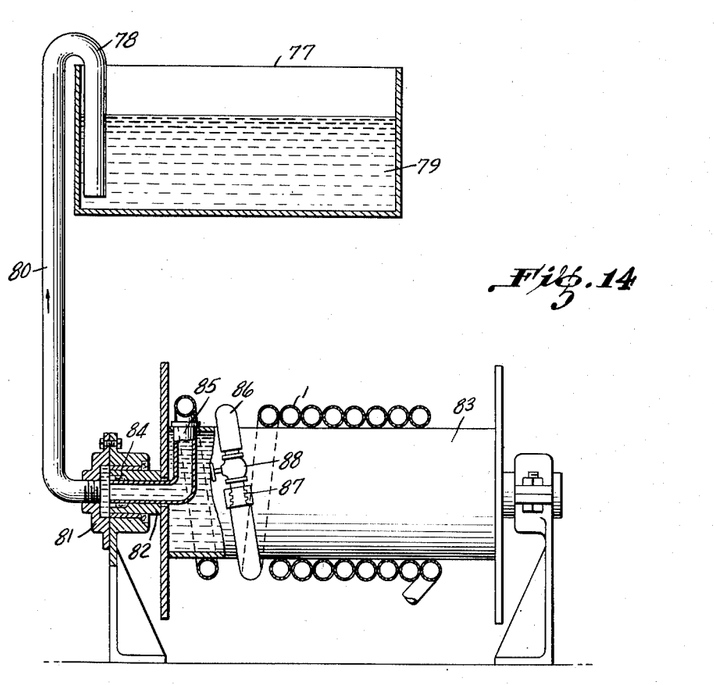
Figure 14 illustrates in diagrammatic way the portion of the equipment provided with the end of the tubing.

Figure 14 illustrates diagrammatically a device that may be used for the feeding of the machine with a liquid-filled thermoplastic tubing, this device being provided with a tank 77 to catch and retain the liquid substance 79 which at each pressure is pushed backwards in the tubing towards the tank. An upper limb 78 of a tube is bent over the rim of the tank and said upper limb must not dip into the collected liquid 79. The lower limb 80 of the tube emerges in the bearing 81 of the trunnion 82 of the rotary drum 83.

In the trunnion 82 is arranged, opposite the opening through which the lower end of the tube emerges in the bearing 81, a channel 84 that extends inside the drum 83 and emerges at 85 at the periphery of this drum in a portion of flexible tube 86, fastened permanently on the latter.

The flexible tube portion 86 is provided with a tip 87 on which is fastened the end of thermoplastic tubing 1, and a cock 88 enabling the tube to communicate with the tank 77 by means of the channel 84 and the tube 80—78.

The bearing 81 is furnished with a suitable water-tight system.

The tubing 1 is wound spirally over the drum 83 and its free end is engaged in the machine in which it is drawn with a movement taking place at regular intervals through the previously disclosed devices. It unwinds then in stages while causing the drum 83 to turn. The flexible tube portion 86 is long enough to reach the first working part of the machine, which enables use to be made of the tubing 1 over all its length and avoids the loss of any appreciable discharge.

Figure 15:
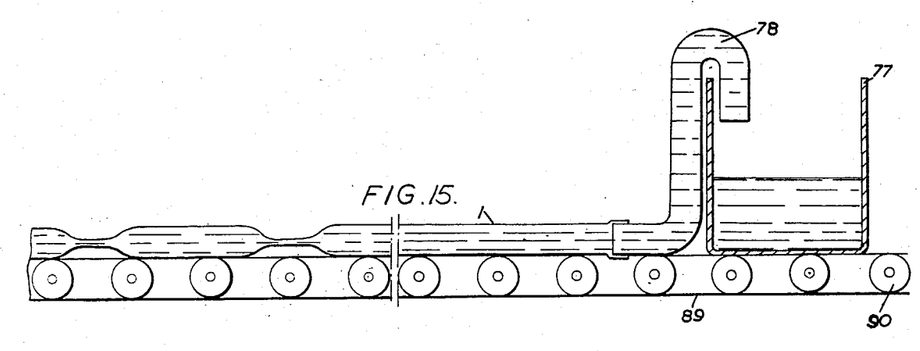
Figure 15 illustrates in diagrammatized view partly in section, a device according to the invention enabling a steady pressure to be kept inside the tubing of thermoplastic material which is already filled with a liquid substance.

Figure 15 illustrates diagrammatically a device that may be used for feeding the machine with a liquid-filled thermoplastic tubing 1.

The tubing is shifted on an endless belt 89 carried by rollers 90.

A receiver marked 77 is placed also on the belt 89 and a bent pipe 78 is connected to the tubing 1 and terminates above the level of the liquid in the receiver 77.

At the time of the compression of the tubing between the presser parts, a similar quantity of the liquid which is pressed aside becomes discharged through the bent pipe 78 into the receiver 77.

The receiver 77 might be provided furthermore with an overflow avoiding thereby the level of the liquid in the receiver 77 from reaching the arm of the pipe 78 located in the receiver.

The filled tubing 1 connected to the arm of the receiver moves step-wise into the machine between the pressing tools.

The movements of the assembled machine parts are synchronized to be in step with each other.

What I desire to claim by Letters Patent of the United States is:

1. A machine for producing containers filled with liquid or paste from a pliable thermoplastic material of tube-like form comprising movably mounted cooperating presser tools for engaging portions of the opposed walls of the tubing when disposed therebetween for causing said portions of the opposed walls to engage, a rotatably mounted disc, cam actuated means operatively associated with said disc for moving said tools towards and away from each other, means for intermittently feeding the tubing between said tools when the tools are spaced apart, said feeding means comprising two spaced apart conveyors at least one of which being provided with a set of V-shaped holders for accommodating tubing of various sizes, said presser tools being arranged in the space between the two said conveyors.

2. A machine for producing containers filled with liquid or paste from a pliable thermosplastic material of tube-like form comprising cooperating presser tools for engaging portions of the opposed walls of the tubing when disposed therebetween for dividing the contents of the tubing and bringing the engaged portions of the opposed walls into contact with one another, at least one of said tools being movable towards and from the other tool, said tools being in the form of electrodes, means for connecting said electrodes to a source of electrical energy including a variable resistance, whereby the temperature of the tools may be balanced and insulating means on the sides of each tool relatively movable with respect to the sides of said tool and being of a width sufficient to keep the contents of the tubing and the internal pressure of the liquid within the tubing away from the pressed opposed walls of the tubing about the area where a welded seal is to take place.

3. A machine for producing containers filled with liquid or paste from a pliable thermoplastic material of tube-like form comprising movably mounted cooperating presser tools for engaging portions of the opposed walls of the tubing when disposed therebetween for causing said portions of the opposed walls to engage, a rotatably mounted disc, cam actuated means for moving said tools towards and away from each other, means for intermittently feeding the tubing between said tools when the tools are spaced apart, said feeding means comprising two spaced apart conveyors at least one of which being provided with a set of V-shaped holders for accommodating tubing of various sizes, said presser tools being arranged in the space between the said two conveyors.

4. A machine to carry out the process for the continuous production of containers filled with liquids or paste from a pliable non-metallic material of thermoplastic nature comprising a pair of tools at least one of which is mobile and the arrangement of said tools being adapted to receive a length of filled tubing therebetween which is pressed between the said pair of tools to distribute the contents in the filled tubing and the contacting walls of said tubing meet in a plane passing through the axis of the tubing, said tools being at a temperature below the fusion temperature of the tubing during the pressing operation, means operatively associated with said tools to produce the degree of heat necessary to unite the contacting walls of the tubing at the pressure places only when said inner walls of the tubing are in contacting engagement, intermittent feed means operatively associated with said tools, heating means and tubing whereby upon completion of a weld the tools are retracted from the tubing and said intermittent feed means moves the filled tubing through the machine between said tools in a discontinuous movement but in constant direction for the next pressing and welding operation of said tools and being in step with the opening movement of said tools, a mobile pressing tool and a stationary counter tool, and a supporting table having two mobile portions for supporting the tubing being located on each side of the counter tool, said mobile portions moving at the same time and in the same direction as the pressing tool, such table movement being equal to the radius of the filled tubing.

5. A machine to carry out the process for the continuous production of containers filled with liquids or paste from a pliable non-metallic material of thermoplastic nature comprising a pair of tools at least one of which is mobile and the arrangement of said tools being adapted to receive a length of filled tubing therebetween which is pressed between the said pair of tools to distribute the contents in the filled tubing and the contacting walls of said tubing meet in a plane passing through the axis of the tubing, said tools being at a temperature below the fusion temperature of the tubing during the pressing operation, means operatively associated with said tools to produce the degree of heat necessary to unite the contacting walls of the tubing at the pressure places only when said inner walls of the tubing are in contacting engagement, intermittent feed means operatively associated with said tools, heating means and tubing whereby upon completion of a weld the tools are retracted from the tubing and said intermittent feed means moves the filled tubing through the machine between said tools in a discontinuous movement but in constant direction for the next pressing and welding operation of said tools and being in step with the opening movement of said tools, and two conveyors adapted to carry the tubing along in equal movements at intervals in a constant direction but in discontinuous matter, said conveyors being spaced apart from each other, said tools for pressing and sealing the tubing being located in the space between said two conveyors in which space the machine carries out pressing and welding during the intervals in the movement of the conveyors.

6. A machine to carry out the process for the continuous production of containers filled with liquids or paste from a pliable non-metallic material of thermoplastic nature comprising a pair of tools at least one of which is mobile and the arrangement of said tools being adapted to receive a length of filled tubing therebetween which is pressed between the said pair of tools to distribute the contents in the filled tubing and the contacting walls of said tubing meet in a plane passing through the axis of the tubing, said tools being at a temperature below the fusion temperature of the tubing during the pressing operation, means operatively associated with said tools to produce the degree of heat necessary to unite the contacting walls of the tubing at the pressure places only when said inner walls of the tubing are in contacting engagement, intermittent feed means operatively associated with said tools, heating means and tubing whereby upon completion of a weld the tools are retracted from the tubing and said intermittent feed means moves the filled tubing through the machine between said tools in a discontinuous movement but in constant direction for the next pressing and welding operation of said tools and being in step with the opening movement of said tools, and nozzles in the neighbourhood of the pressing tools through which compressed air is blown on to the pressing tools during welding.

7. The machine in accordance with claim 6, wherein a nozzle is rigidly fixed to each of the pressing tools and moves therewith.

8. A machine to carry out the process for the continuous production of containers filled with liquids or paste from a pliable non-metallic material of thermoplastic nature comprising a pair of tools at least one of which is mobile and the arrangement of said tools being adapted to receive a length of filled tubing therebetween which is pressed between the said pair of tools to distribute the contents in the filled tubing and the contacting walls of said tubing meet in a plane passing through the axis of the tubing, said tools being at a temperature below the fusion temperature of the tubing during the pressing operation, means operatively associated with said tools to produce the degree of heat necessary to unite the contacting walls of the tubing at the pressure places only when said inner walls of the tubing are in contacting engagement, intermittent feed means operatively associated with said tools, heating means and tubing whereby upon completion of a weld the tools are retracted from the tubing and said intermittent feed means moves the filled tubing through the machine between said tools in a discontinuous movement but in constant direction for the next pressing and welding operation of said tools and being in step with the opening movement of said tools and conveyors one carrying a receiver to retain the liquid pressed backwards in the tubing at each pressing operation, an end portion of the tubing being bent above said receiver, said bent portion being of such length that it does not dip into the liquid of the receiver.

9. A machine to carry out the process for the continuous production of containers filled with liquids or paste from a pliable non-metallic material of thermoplastic nature comprising a pair of tools at least one of which is mobile and the arrangement of said tools being adapted to receive a length of filled tubing therebetween which is pressed between the said pair of tools to distribute the contents in the filled tubing and the contacting walls of said tubing meet in a plane passing through the axis of the tubing, said tools being at a temperature below the fusion temperature of the tubing during the pressing operation, means operatively associated with said tools to produce the degree of heat necessary to unite the contacting walls of the tubing at the pressure places only when said inner walls of the tubing are in contacting engagement, intermittent feed means operatively associated with said tools, heating means and tubing whereby upon completion of a weld the tools are retracted from the tubing and said intermittent feed means moves the filled tubing through the machine between said tools in a discontinuous movement but in constant direction for the next pressing and welding operation of said tools and being in step with the opening movement of said tools, each comprising a pair of insulator members, a conductor disposed between said insulator members, both of said insulator members and said conductor being positioned upon pressing and sealing to contact the filled tubing, said insulator members on each side of said conductor being movable up and down with respect to the sides of said conductor whereby upon pressing the tools together upon opposite sides of the tubing the contents of the tubing is first displaced from the area to be sealed, the conductor being withdrawn from the sealed filled tubing before the insulators leave contact with the tubing.

References Cited in the file of this patent

UNITED STATES PATENTS

| 277,707 | Gonon | May 15, 1883 |
| 876,755 | Webb | Jan. 14, 1908 |
| 1,417,591 | Anderson | Aug. 12, 1930 |
| 1,773,079 | Birdseye | Aug. 12, 1930 |
| 2,089,273 | Lakso | Oct. 10, 1937 |
| 2,113,658 | Lakso | Apr. 12, 1938 |
| 2,134,862 | Dunnam | Nov. 1, 1938 |
| 2,162,230 | Salfisberg | June 13, 1939 |
| 2,166,643 | Salfisberg | July 18, 1939 |
| 2,222,011 | Zwoyer | Nov. 19, 1940 |
| 2,269,533 | Howard | Jan. 13, 1942 |
| 2,430,995 | Roos | Nov. 18, 1947 |
| 2,469,975 | McCloy | May 10, 1949 |
| 2,475,617 | Irmscher | July 12, 1949 |
| 2,494,484 | Nicolle | Jan. 10, 1950 |
| 2,496,609 | Van Antwerpen | Feb. 7, 1950 |
| 2,501,690 | Pendergast | Mar. 28, 1950 |
| 2,512,216 | Salfisberg | June 20, 1950 |
| 2,530,400 | Rado | Nov. 21, 1950 |